US006836645B2

(12) United States Patent
Hilgers et al.

(10) Patent No.: US 6,836,645 B2
(45) Date of Patent: Dec. 28, 2004

(54) GPS RECEIVER MODULE

(75) Inventors: Achim Hilgers, Alsdorf (DE); Indra Ghosh, Duesseldorf (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 77 days.

(21) Appl. No.: 10/208,680

(22) Filed: Jul. 30, 2002

(65) Prior Publication Data

US 2003/0025635 A1 Feb. 6, 2003

(30) Foreign Application Priority Data

Aug. 2, 2001 (DE) .......................................... 101 37 838

(51) Int. Cl.[7] .............................................. H04B 1/40
(52) U.S. Cl. ...................... 455/84; 455/552.1; 455/280; 343/700 MS
(58) Field of Search ................................ 455/552.1, 84, 455/41.3, 456.6, 553.1, 280, 289, 41.2, 344, 345, 456.1; 343/700 MS

(56) References Cited

U.S. PATENT DOCUMENTS 5,786,789 A * 7/1998 Janky ...................... 342/357.1
5,945,944 A * 8/1999 Krasner .................. 342/357.06
2001/0039475 A1 * 11/2001 McCarthy et al. .......... 701/213

FOREIGN PATENT DOCUMENTS

EP          1079463        2/2001    ............ H01Q/9/28

* cited by examiner

Primary Examiner—Rafael Perez-Gutierrez
(74) Attorney, Agent, or Firm—Aaron Waxler

(57) ABSTRACT

A GPS receiver module (1) for receiving GPS signals and for determining position data therefrom is described, which is characterized in particular by a communications sub-module (3), to which the position data determined can be fed and by means of which said data can be converted into a format suitable for transmission to an a external appliance. The communications sub-module (3) is preferably a Bluetooth (BT) sub-module, by means of which the position data can be converted according to the Bluetooth standard and transmitted by wireless means. A dual band antenna particularly suitable for use with the GPS receiver module is furthermore described, by means of which it is not only possible to receive GPS signals, but also to establish a communications link with external appliances.

20 Claims, 3 Drawing Sheets

GPS RECEIVER MODULE

The invention relates to a GPS (Global Positioning System) receiver module for receiving GPS signals and for determining position data therefrom, and to a dual band antenna for such a receiver module.

As is well-known, GPS signals serve for global position finding and navigation and are emitted by a network of satellites totaling 24 satellites, which circle the Earth on different orbits, so that at least five satellites are visible at any point on the Earth's surface at any one time.

The position finding is based on the principle of a transit time measurement of signals, which are modulated upon electromagnetic carrier waves with a carrier frequency of 1575.42 MHz. The signals emitted by the satellites are time-synchronized and consist of two parts. A first part contains the respective satellite positions and the time with which a clock in the GPS receiver is synchronized. From the second part, the GPS receiver determines the orbit data of the satellites that can be received at that instant. The position of the GPS receiver is calculated from these.

GPS receiver modules which contain the receiving and evaluation electronics needed for this are already known. Depending on the purpose for which the module is intended, the position data are either delivered to an interface for further processing in other units, or the module has an integral display unit for the position data. Modules of this type are built into mobile and fixed navigation equipment for applications in aviation, shipping and road traffic.

Since GPS modules are becoming ever smaller and less expensive, efforts are also being made to fit these into appliances that do not typically serve for navigation purposes, such as mobile telephones, portable computers and wristwatches, for example. The integration of a GPS module into such an appliance, however, in many cases also calls for extensive intervention in the electronics of the appliance itself where, for example, inputs to the GPS module are to be made via a keypad of the appliance or position data are to be shown on a display of the appliance.

An object of the invention is therefore to provide remedies in these instances and to identify a more simple way of connecting GPS receiver modules to other electronic equipment.

In particular, the invention is intended to create a GPS receiver module, which is capable of interacting with a multiplicity of other appliances.

Finally, the invention is also intended to create an integrated GPS receiver module, which contains all units needed for reception and evaluation, and for communication with one of the aforementioned appliances.

In addition, the invention is intended to create a dual band antenna, which is particularly suited to integration with such a GPS receiver module and by means of which it is not only possible to receive the GPS signals but also to establish a communications link with the said appliances.

This object is achieved by a GPS receiver module, which as claimed in claim 1 is characterized by a communications sub-module, to which the position data determined can be fed and by means of which these data can be converted into a format suitable for transmission to an external appliance.

One advantage of this solution is that it permits the use of GPS receiver modules with those external appliances that have a corresponding interface for this format.

As claimed in claim 2, a communications module to the Bluetooth standard is particularly advantageous in this respect, since more and more appliances are being equipped as standard with a Bluetooth interface.

The embodiment as claimed in claim 3 has the advantage that the GPS receiver module can receive not only GPS signals but also data from other external appliances and can, where appropriate, also be correspondingly controlled thereby.

The embodiment as claimed in claim 4 lends itself to an exceptional degree of miniaturization, whilst the embodiments as claimed in claims 5 and 6 also permit line transmission of data between the GPS receiver module and an external appliance, that does not have an interface to the Bluetooth standard.

As claimed in claim 7, a dual band antenna, which is particularly well-suited to integration with the GPS receiver module, is characterized by the following features: a ceramic substrate with a first resonant conductor path structure and a second resonant conductor path structure, which are connected to a common feed, the length of the first conductor path structure corresponding to approximately half the wavelength of a BT signal in the substrate and the length of second conductor path structure to approximately half the wavelength of a GPS signal in the substrate.

At this point it should be mentioned that although EP 1 079 463 discloses "asymmetrical dipole antennas", which are intended for service in the GPS or BT band, these are microstrip transmission line antennas, in which a metallic surface forming a reference potential (generally on the back of the substrate) must be present. Since the antennas according to the invention work on the principle of wire antennas, however, this prior art is obviously not relevant.

The invention will be further described with reference to examples of embodiments shown in the drawings to which, however, the invention is not restricted, and in which.

Figure 1:
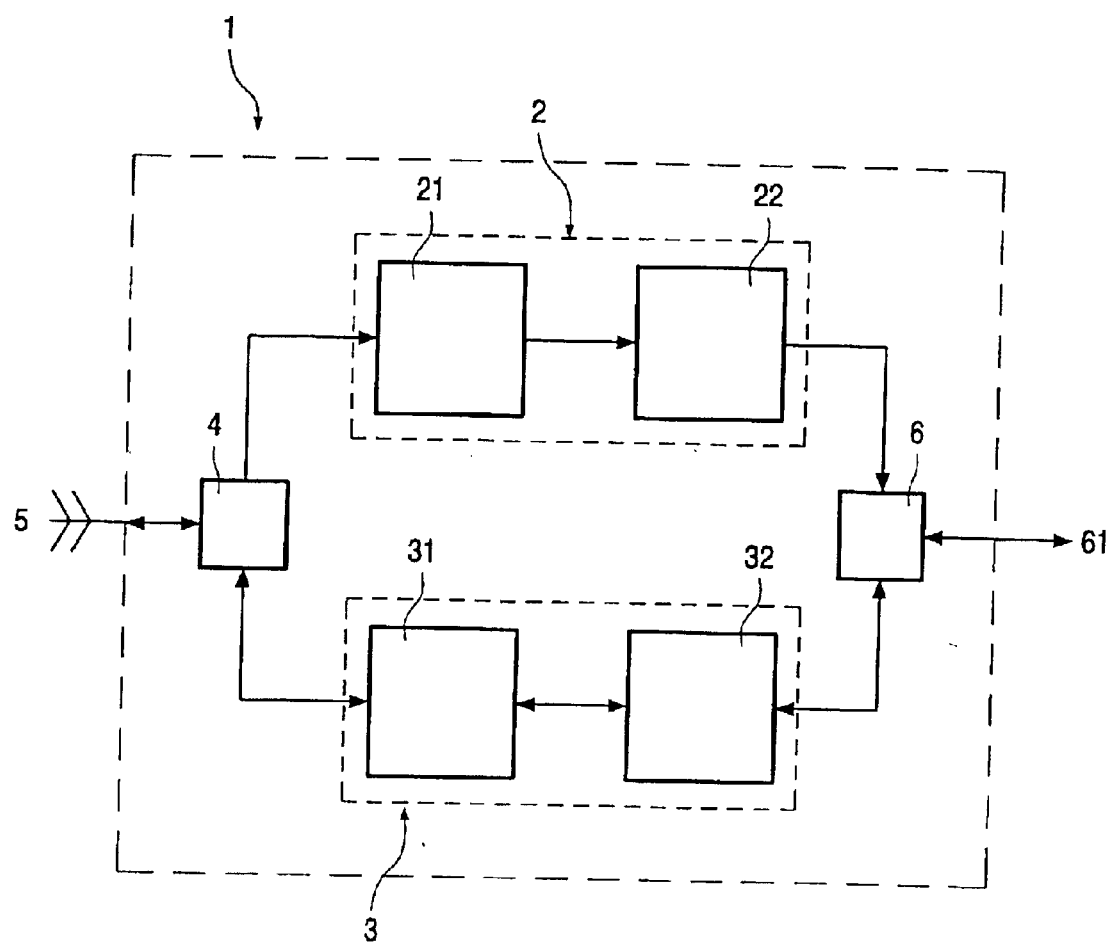
FIG. 1 shows a schematic representation of a first embodiment of the GPS receiver module.

FIG. 1 shows a first embodiment of the GPS receiver module 1 according to the invention, which contains a GPS sub-module 2 and a communications sub-module 3, which operates to the known Bluetooth (BT) standard.

The GPS sub-module 2 has a HF circuit part 21 for receiving GPS signals (generally on the carrier frequency 1575.42 MHz) and for converting these signals into low-frequency position signals. These position signals are converted by a GPS baseband circuit part 22, connected to the HF circuit part 21, into position data that can be evaluated for a user. Various signal processing methods are known for this purpose, which will not be explained further here.

The BT sub-module 3 contains a HF circuit part 31 for the reception and transmission of signals in the Bluetooth band (BT band), which lies approximately in the frequency range between 2400 and 2483.5 MHz, and a BT baseband circuit part 32, which has a bi-directional connection to the HF circuit part 31 and by means of which the BT signals to be transmitted and received according to the BT standard are coded and decoded, and if necessary compressed and decompressed. Signal processing methods for this are also known, so that no explanation will be given here.

The two HF circuit parts 21, 31 of the sub-modules 2, 3 can be connected via a change-over switch 4 to a dual band antenna 5. The antenna 5 serves for receiving GPS signals and for the reception and transmission of signals in the Bluetooth band.

The two baseband circuit parts 22, 32 of the sub-modules 2, 3 are connected to an interface circuit 6, via which the sub-modules 2, 3 can exchange data with one another, as they can with an external appliance (not shown) via an external line connection 61. The two sub-modules 2, 3 are designed as independently functioning units.

With the GPS sub-module 2, therefore, GPS signals can be received, converted and translated into position data, which are then fed via the interface circuit 6 to the BT sub-module 3, in order to transmit these data, after conversion into signals coded according to the BT standard, via the antenna 5 to another appliance (for example, a computer, a mobile telephone etc.), which has an interface for the reception and decoding of BT coded signals.

Alternatively, the position data can also be fed via the interface circuit 6 and the external line connection 61 to appliances (such as a display unit) that do not have a Bluetooth interface.

It is furthermore also possible, via the antenna 5, the change-over switch 4 and the second sub-module 3, to receive signals from other appliances coded according to the BT standard, which are then converted into a baseband, decoded and fed via the interface circuit 6 and the external line connection 61 to a connected appliance for control and/or data communication. Conversely, the interface circuit 6 can also be designed for the line transmission of data from an external appliance to the sub-module 3.

Figure 2:
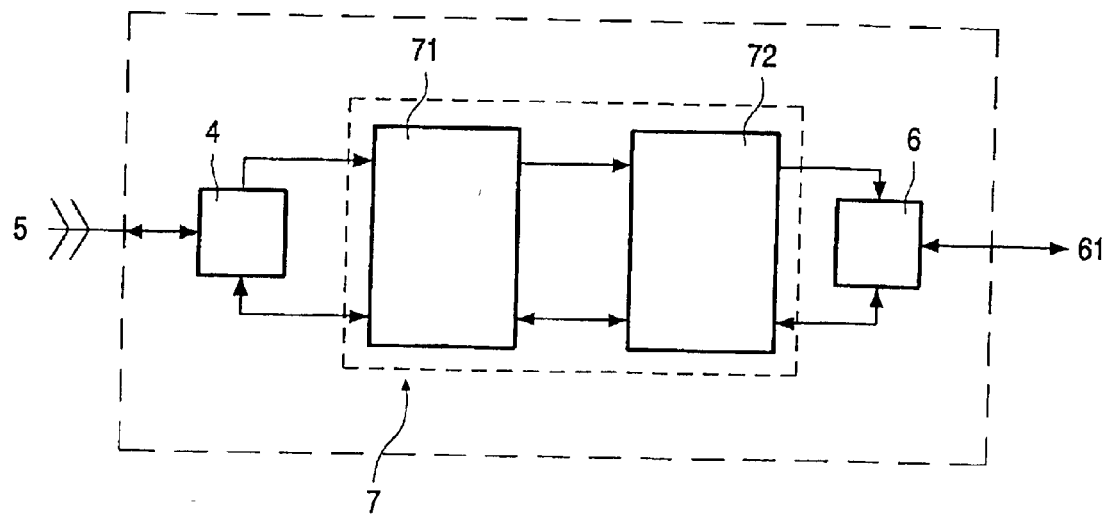
FIG. 2 shows a schematic representation of a second embodiment of the GPS receiver module.

FIG. 2 shows a second embodiment of the module 1 according to the invention, in which the separate sub-modules 2, 3 shown in FIG. 1 are combined into a common sub-module 7.

This sub-module 7 comprises a common HF circuit part 71 for GPS signals and BT signals respectively, together with a common baseband circuit part 72, the circuit part 71 combining the functions of the circuit parts 21 and 31 and the circuit part 72 combining the functions of the circuit parts 22 and 32 according to FIG. 1.

In addition, a change-over switch 4 and a dual band antenna 5, via which GPS signals and BT signals can be received, and BT signals can be transmitted, are also provided here, as in the first embodiment. Finally, in this second embodiment, too, there is also an interface circuit 6, for a bi-directional connection with other appliances by means of the external line connection 61, as explained above.

The basic function of this second embodiment and the scope of its applications are the same as those of the first embodiment, so that these will not be explored further again.

A particular advantage of this second embodiment is that it can be miniaturized to an even greater extent, resulting in a further reduction in manufacturing costs and widening the range of applications.

The antenna 5 is preferably a ceramic dual band antenna, via which both the GPS signals and the BT signals can be received and the BT signals can also be transmitted. Such an antenna, particularly suited to the GPS receiver module 1 according to the invention, will be described below.

Figure 3:
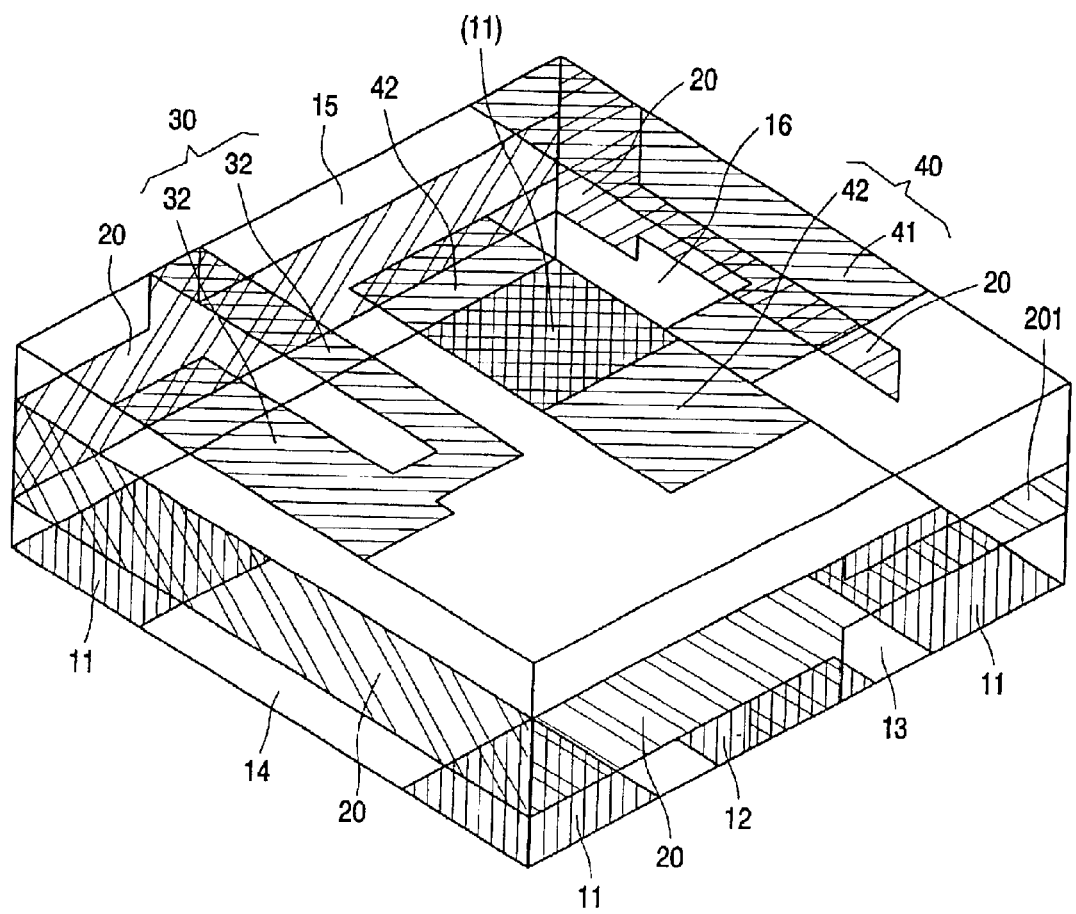
FIG. 3 shows an embodiment of a dual band antenna according to the invention.

FIG. 3 shows the schematic construction of such an antenna.

This antenna is basically of the so-called "Printed Wire Antenna" type, in which one or more conductor paths are mounted on a substrate. In principle, therefore, these antennas are wire antennas, which in contrast to microstrip transmission line antennas have no metallic surface forming a reference potential on the back of the substrate.

The embodiment described has a ceramic substrate composed of an essentially rectangular block, the height of which is smaller than its length or width by a factor of 3 to 10. On this basis, in the following description the upper and lower (large) surface of the substrate in FIG. 3 will be referred to as first upper and second lower face respectively and the surfaces perpendicular to these (periphery of the substrate) as first to fourth side faces.

Alternatively, however, it is also possible, instead of a substrate in the form of a rectangular solid, to opt for other geometric shapes, such as a cylindrical shape, to which two resonant conductor path structures are applied in a spiral pattern, for example.

The substrates may be manufactured by imbedding a ceramic powder into a polymer matrix and have a relative permittivity of $\epsilon_r > 1$ and/or a relative permeability of $\mu_r > 1$.

In particular, the antenna according to FIG. 1 comprises a substrate 10 in the shape of a rectangular solid, which at the corners of its lower face is provided with a plurality of soldering points 11, by which it can be soldered on to a circuit board using surface mount (SMI) technology. In addition, there is on the lower face, in the central area of a first side face 13, a feed 12 in the form of a metallization piece, which when mounting on a circuit board is soldered on a corresponding conductor area, via which the electromagnetic energy is fed from and to the antenna.

Two resonant conductor path structures 20, 30; 20, 40, which are connected to a circuit board via the common feed 12, are mounted on the surface of the substrate 1.

The first conductor path structure is formed by a conductor path 20 running on the periphery of the substrate together with a first metallization structure 30 on what is, in the figure, the upper (first) face of the substrate 1, and in respect of its resonant length is tuned to the frequency band of the BT signals. The second conductor path structure is formed by the conductor path 20 together with a second metallization structure 40 on the first face of the substrate and in respect of its resonant length is tuned to the frequency band of the GPS signals.

The effective length of the two conductor path structures between the feed 12 and the end of the metallization structure 30 or 40 corresponds to approximately half the wavelength of the BT or GPS signal in the substrate.

From the feed 12 a first section of the conductor path 20 extends vertically to approximately half the height of the first side face 13, the conductor path then continuing in a horizontal direction along the first side face 13 to a second side face 14. Furthermore, proceeding from the first section is a first tuning stub 201, which is narrower than the conductor path and which extends along the first side face 13 in an opposite direction to the conductor path 20.

The conductor path 20 runs further in a horizontal direction along the second side face 14 at approximately half the height thereof and then along a third side face 15, situated opposite the first side face 13, at approximately half-height. The conductor path 20 finally ends at the fourth side face 16, where it merges into a second tuning stub 202, narrower than the conductor path 20 and extending along this side face.

The first metallization structure 30 is connected via a first branch on the third side face 15 to the conductor path 20.

The first metallization structure 30 on the first side face comprises a conductor path section 31, which extends essentially towards the feed 12, together with an essentially rectangular metallization wafer 32 arranged parallel thereto, into which the conductor path section 31 opens.

The second metallization structure 40 is connected via a second branch on the fourth side face 15 to the end of the conductor path 20.

The second metallization structure 40 on the first face comprises a conductor path section 41, which extends along the edge of the upper face essentially towards the feed 12, together with an essentially rectangular metallization wafer 42 arranged parallel thereto, into which the conductor path section 41 opens.

With the two tuning stubs 201, 202, the resonance frequencies of the first and second conductor path structure 20, 30; 20, 40 can be shifted by slight shortening or reduction and the impedance adjustments optimized. The influence of the various hardware configurations, such as the HF screening, the package materials etc. on the position of the resonance frequencies and their influence on the impedance can thereby also be easily compensated for, so that the conductor path structures do not have to be modified for each actual application. This also opens up the possibility of using the dual band antenna according to the invention not only for the GPS receiver module according to the invention, but also as a separate component in a number of applications.

In a possible embodiment of this dual band antenna, the dimensions of the substrate 10 are approximately 6×6×2.0 mm$^3$. The material chosen for the substrate 10 has a relative permittivity $\epsilon_r=18.55$ and a tan $\delta=1.17\times10^{-4}$. This approximates to the HF characteristics of a commercial NP0-K17 ceramic ($Ca_{0.05}Mg_{0.95}TiO_3$ ceramic). The printed conductor paths were produced by means of silver paste.

Figure 4:
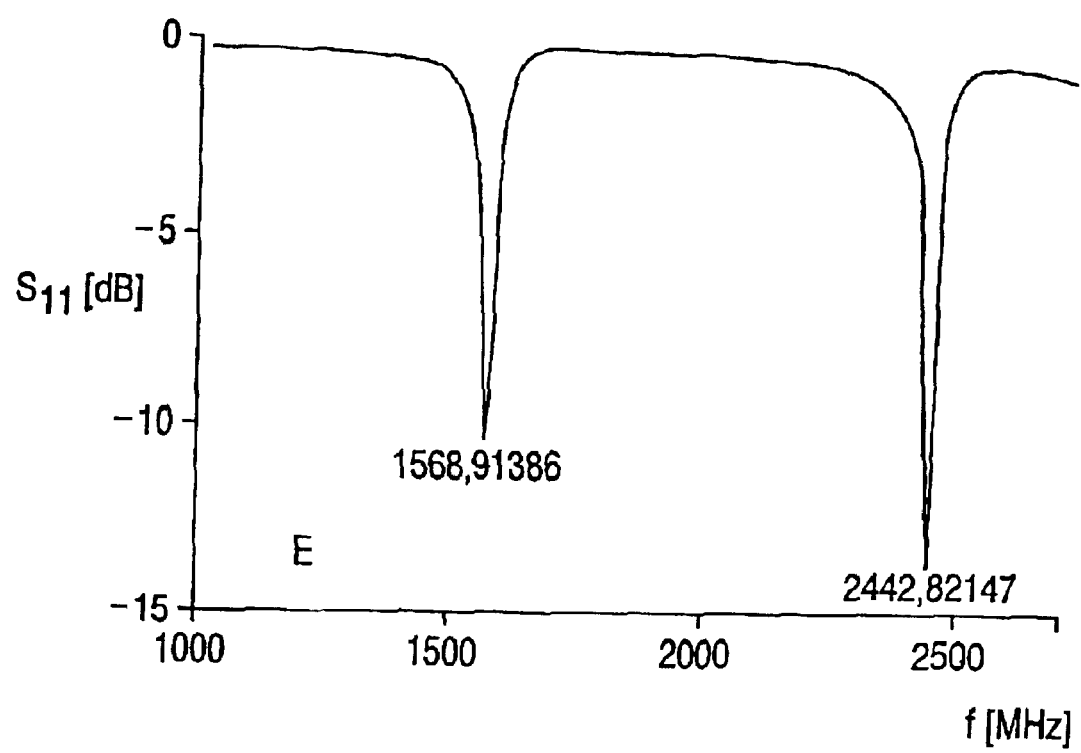
FIG. 4 shows an impedance spectrum of the antenna according to FIG. 3.

FIG. 4 finally shows the graph of the impedance of such an antenna over the frequency. Clearly recognizable are the two minima, which for the first conductor path structure 20, 30 for the Bluetooth signals occur at 2442.82147 MHz and for the second conductor path structure 20, 40 for the GPS signals at 1568.91386 MHz.

The GPS receiver module 1 according to the invention and the dual band antenna according to the invention are preferably integrated with one another and mounted or soldered on to a printed circuit board, for example, which may carry other components of the appliance in question. Such an appliance may be, in particular, a mobile telecommunications appliance, such as a mobile phone, which is intended for service in the GSM or UMTS band.

What is claimed is:

1. A GPS receiver module for receiving GPS signals and for determining position data from the signals, comprising:
   GPS sub-modules connected in a communicatively uni-directional configuration having a first end and a second end;
   a plurality of communications sub-modules attached in a communicatively bi-directional linear configuration that has antenna at one end and that is joined directly to said first end by an interface connected to a third path, said second end being joined between the antenna and a remaining part of said bi-directional linear configuration, determined position data being fed to a sub-module (3) of the plurality that converts said determined position data into a format suitable for transmission to an external appliance; and
   a dual band antenna (5) having a ceramic substrate (10) with a first resonant conductor path structure (20, 30) and a second resonant conductor path structure (20, 40), which are connected to a common feed (12), the length of the first conductor path structure (20, 30) corresponding to approximately half the wavelength of BT signal in the substrate (10) and the length of the second conductor path structure (20, 40) to approximately half the wavelength of a GPS signal in the substrate (10).

2. A GPS receiver module as claimed in claim 1, characterized in that, said sub-module (3) is a Bluetooth (BT) sub-module, by means of which the position data can be converted according to the Bluetooth standard and transmitted by wireless means.

3. A GPS receiver module as claimed in claim 2, characterized by a sub-module (7) having a HF circuit part (71) for the processing of GPS and BT signals received and of BT signals to be transmitted in at least one HF band, together with a baseband circuit part (72) for the processing of GPS and BT signals in at least one baseband.

4. A GPS receiver module as claimed in claim 2, characterized in that, the BT sub-module (3) is designed for the reception and decoding of signals coded according to the BT standard.

5. A GPS receiver module as claimed in claim 1, wherein said interface comprises an interface circuit (6) configured for feeding the position data determined to an external wire-bound appliance.

6. A GPS receiver module as claimed in claim 5, characterized in that the interface circuit (6) is designed for the line transmission of data from an external appliance to said sub-module (3, 7).

7. The GPS receiver module as claimed in claim 1, wherein the joining of said second end is by means of a change-over switch connected to said second end, said antenna and said remaining part.

8. The GPS receiver module as claimed in claim 7, wherein said bi-directional linear configuration includes said interface and said third path, said third path being bi-directional.

9. The GPS receiver module as claimed in claim 8, wherein said third path comprises an external line.

10. The GPS receiver module as claimed in claim 7, wherein said third path comprises an external line.

11. The GPS receiver module as claimed in claim 1, wherein said bi-directional linear configuration includes said interface and said third path, said third path being bi-directional.

12. The GPS receiver module as claimed in claim 11, wherein said third path comprises an external line.

13. The GPS receiver module as claimed in claim 12, wherein the plural communications sub-modules operate in tandem.

14. A printed circuit board, especially for the surface mounting of electronic components, characterized by a GPS receiver module (1) for receiving GPS signals and for determining position data therefrom, characterized by a communications sub-module (3), to which the position data determined can be fed and by means of which said data can be converted into a format suitable for transmission to an external appliance, and a dual band antenna (5) characterized by a ceramic substrate (10) with a first resonant conductor path structure (20, 30) and a second resonant conductor path structure (20, 40), which are connected to a common feed (12), the length of the first conductor path structure (20, 30) corresponding to approximately half the wavelength of a BT signal in the substrate (10) and the length of the second conductor path structure (20, 40) to approximately half the wavelength of a GPS signal in the substrate (10).

15. A mobile telecommunications appliance, particularly for the GSM or UMTS band, characterized by a printed circuit board as claimed in claim 14.

16. A dual band antenna, especially for use with a GPS receiver module for receiving GPS signals and for determining position data therefrom, characterized by a communications sub-module (3), to which the position data determined can be fed and by means of which said data can be converted into a format suitable for transmission to an external appliance, characterized by a ceramic substrate (10) with a first resonant conductor path structure (20, 30) and a second resonant conductor path structure (20, 40), which are connected to a common feed (12), the length of the first conductor path structure (20, 30) corresponding to approximately half the wavelength of a BT signal in the substrate (10) and the length of the second conductor path structure (20, 40) to approximately half the wavelength of a GPS signal in the substrate (10).

17. A GPS receiver module as claimed in claim 16, characterized in that, said sub-module (3) is a Bluetooth (BT) sub-module, by means of which the position data can be converted according to the Bluetooth standard and transmitted by wireless means.

18. A GPS receiver module as claimed in claim 16, characterized by an interface circuit (6) configured for feeding the position data determined to an external wire-bound appliance.

19. A GPS receiver module as claimed in claim 18, characterized in that the interface circuit (6) is designed for the line transmission of data from an external appliance to the sub-module (3, 7).

20. A GPS receiver module for receiving GPS signals and for determining position data therefrom, characterized by a communications sub-module (3), to which the position data determined can be fed and by means of which said data can be converted into a format suitable for transmission to an external appliance, characterized by a dual band antenna (5) characterized by a ceramic substrate (10) with a first resonant conductor path structure (20, 30) and a second resonant conductor path structure (20, 40), which are connected to a common feed (12), the length of the first conductor path structure (20, 30) corresponding to approximately half the wavelength of a BT signal in the substrate (10) and the length of the second conductor path structure (20, 40) to approximately half the wavelength of a GPS signal in the substrate (10).

* * * * *